United States Patent [19]

Habelmann et al.

[11] Patent Number: 4,768,377

[45] Date of Patent: Sep. 6, 1988

[54] METHOD AND APPARATUS FOR MEASURING THE LIQUID LEVEL IN TANKS SUBJECTED TO VARYING ACCELERATIONS

[75] Inventors: Erich Habelmann; Wolfgang Zabel, both of Rüsselsheim; Horst Beisenkötter, Nauheim; Knut Gebhardt, Büttelborn, all of Fed. Rep. of Germany

[73] Assignee: General Motors Corporation, Detroit, Mich.

[21] Appl. No.: 930,442

[22] Filed: Nov. 13, 1986

[30] Foreign Application Priority Data

Nov. 16, 1985 [DE] Fed. Rep. of Germany ....... 3540806

[51] Int. Cl.$^4$ ................. G01F 23/36; G08B 23/00
[52] U.S. Cl. ...................................... 73/313; 73/308; 340/618; 340/529; 340/59
[58] Field of Search ............. 73/290 R, 290 V, 304 R, 73/304 C, 308, 313, 317; 364/509, 571; 340/618, 625, 59, 526, 529, 530, 442, 573; 123/196 S, 198 D; 184/6.4, 108

[56] References Cited

U.S. PATENT DOCUMENTS

| | | | |
|---|---|---|---|
| 3,246,517 | 4/1966 | Malkiewicz | 73/308 |
| 3,540,026 | 11/1970 | Scott | 340/526 |
| 3,828,338 | 8/1974 | Kato | 340/529 |
| 3,938,117 | 2/1976 | Bozoian | 340/59 |
| 4,306,525 | 12/1981 | Faxvog | 123/198 D |
| 4,386,406 | 5/1983 | Igarashi et al. | 364/442 |
| 4,470,296 | 9/1984 | Kobayashi et al. | 73/113 |
| 4,509,044 | 4/1985 | Yachida | 73/313 |
| 4,513,277 | 4/1985 | Moore et al. | 340/59 |
| 4,521,768 | 6/1985 | Haran et al. | 340/529 |
| 4,528,553 | 7/1985 | Hastings et al. | 340/529 |
| 4,539,547 | 9/1985 | Nagy, Jr. et al. | 73/308 |
| 4,625,284 | 9/1986 | Suzuki | 73/313 |

FOREIGN PATENT DOCUMENTS

| | | |
|---|---|---|
| 0094298 | 11/1983 | European Pat. Off. . |
| 3028738 | 2/1981 | Fed. Rep. of Germany . |
| 3126544 | 1/1983 | Fed. Rep. of Germany . |
| 3152914 | 1/1984 | Fed. Rep. of Germany . |

Primary Examiner—William A. Cuchlinski, Jr.
Assistant Examiner—Patrick R. Scanlon
Attorney, Agent, or Firm—Warren D. Hill

[57] ABSTRACT

It will thus be seen that the method for measuring the level of a liquid contained in a reservoir which is subjected to varying accelerations is carried out by means of a level sensor which signals when the level of the liquid drops below a predetermined level, and a warning device which is activated if the sensor signal is applied thereto uninterruptedly for a predetermined minimum period of time and results in maximizing functional reliability of the warning signal issuing means during all types of movement situations of the reservoir, while false alarms are virtually eliminated. This is accomplished in that each occurrence involving the uninterrupted application of a sensor signal for a period which is longer than the predetermined time period ($t_1$) is registered as an event, and in that the warning device is activated after a predetermined number (n) of events have been registered within a predetermined period of time (m). The apparatus used to implement this method is comprised of a reservoir, a level sensor fixedly mounted therein for signaling when the liquid drops below a predetermined minimum level, a warning device which is activated by the level sensor after a sensor signal has been applied thereto uninterruptedly for a predetermined minimum period of time, and a warning signal indicating device as well as an event storage device for storing each activating event and for actuating the warning signal issuing device at the end of a preset event storage phase.

4 Claims, 3 Drawing Sheets

METHOD AND APPARATUS FOR MEASURING THE LIQUID LEVEL IN TANKS SUBJECTED TO VARYING ACCELERATIONS

FIELD OF THE INVENTION

The invention relates to a method and apparatus of measuring the liquid level in tanks subjected to varying accelerations.

BACKGROUND OF THE INVENTION

Devices for sensing the liquid level in tanks subjected to varying accelerations have been used heretofore, for instance, in motor vehicles for monitoring the liquid level in tanks containing hydraulic fluids, lubricating oils, cooling liquids and fuels.

One typical example is the monitoring of the level of the lubricating oil used in internal combustion engines. At present, there are two different methods available by which the level of the lubricating oil can be monitored.

In the case of the so-called "static warning" method, a one-time oil level measurement takes place while the vehicle is still at rest, especially prior to starting the engine. For instance, the liquid level is measured at the time the ignition is turned on. For this purpose, a great variety of suitable sensors are available, including optical sensors, resistance-type elements, thermo elements, etc. If the oil level is too low, a warning indicating means, such as a warning lamp, is activated after the engine has been started.

The disadvantage of this method is that the same sensor cannot be used to detect an oil shortage that might occur during vehicle travel, because the oil level in the crankcase is lower when the engine is running than when it is not running, and the oil level varies during vehicle operation.

The second method, while falling into the same general category of liquid level sensing systems, is based on what is called the "dynamic warning" principle. Here, the oil level is measured only when the engine is running, i.e., when it is hot, and any oil shortage occurring during vehicle travel is indicated. One type of sensor that is being used in this system is a float switch which is arranged at a suitable place in the crankcase. The float switch may include a reed contact which is contained in a damping cup. However, a liquid level sensor of this type may, under certain vehicle operating conditions, simulate an oil shortage condition which, in fact, does not exist. This must not be allowed to happen. For instance, if the body of lubricating oil, due to acceleration and weight forces generated as a result of vehicle cornering, changes in speed or travel on inclined road surfaces, changes its position in the crankcase, the oil level at the place where the oil level sensor is located may be lower than the oil level which would exist if the vehicle were to travel at a constant speed on a level road, or if the vehicle were at rest. It is for this reason that in the case of the "dynamic warning" method, the warning indicating means, i.e., the warning lamp, is not actuated unless the sensor signal has been applied thereto by the sensor uninterruptedly for a specified period of time. After being actuated, the warning indicating means may remain in the "warning" mode, or may be turned off after a specified period of time. The disadvantage of this prior art liquid level sensing method is that no level sensing can take place, and therefore no warning be issued, prior to vehicle travel, because if, at the start of vehicle travel, a low oil level signal is issued by the sensor, it will not be on long enough to actuate the warning signal indicated means. Another disadvantage of this prior art method is the difficulty of finding a suitable installation location for the level sensor, and to decide on a suitable minimum time interval during which the sensor signal must be on to activate the warning signal. The problem associated with determining a suitable minimum time interval is that a compromise must be made to satisfy two conflicting requirements. On the one hand, since allowance must be made for those instances where the liquid in the reservoir is subjected to accelerations and skewing for a relatively long period of time, it is desirable that, if false alarms are to be avoided, the time interval be relatively long. However, in those situations where the oil level is below the threshold value during a period of time when the body of oil in the crankcase is not subjected to accelerations, i.e., when the vehicle travels at a constant speed on a level road, or when the vehicle is not moving at all, it is desirable that, in order to avoid engine damage, the time interval be relatively short, since there exists a situation where the oil level has not just seemed to drop, but has actually dropped below the specified threshold value.

SUMMARY OF THE INVENTION

In view of the above considerations, it is the object of the present invention to provide a method and an apparatus of the type identified above which enable proper functioning of the warning device regardless of the movement to which the oil reservoir is subjected, and which ensure that false alarm situations are eliminated or reduced to a minimum. More particularly, it is the purpose of the invention to provide an oil shortage warning system which employs one single oil level sensor for the so-called "dynamic warning" as well as for the so-called "static warning", i.e., warning to the driver before the beginning of vehicle travel.

The invention is carried out by the method of measuring the level of liquid in tanks subject to varying acceleration, comprising the steps of: generating a sensor signal when the liquid has dropped below a preset minimum level, detecting each event of a sensor signal being on continuously for a longer time than a first preset minimum period ($t_1$), and generating a warning signal whenever a preset number (n) of events are detected during a second period (m) which is long in comparison to the first minimum period.

The invention is also carried out by apparatus for measuring the level of liquids contained in a reservoir subject to varying accelerations comprising: a level sensor mounted within the reservoir for issuing a signal when the liquid drops below a predetermined minimum level, a warning device which is activated when a sensor signal has been applied thereto continuously by the level sensor for a preset minimum period to thereby detect an event, an event storage device for storing each event detected by the warning device, and a warning signal indicating device responsive to the state of the event storage device for issuing a warning signal when the detected events reach a preset number.

The following are some of the advantages that are realized by the invention:

The duration of the first minimum time interval, after which a sustained uninterrupted signal is registered, can be kept considerably shorter in comparison to prior art systems, so that under highly unfavorable operating conditions, e.g., heavily fluctuating accelerations, an early indication can be given when the specified minimum oil level in the reservoir is about to be reached.

There is greater freedom in the selection of the installation position for the level sensor in the reservoir.

Depending on the particular operating conditions to which the reservoir is subjected, the time at which the warning device is actuated can be moved ahead or delayed by either shortening or lengthening the event storage phase, i.e., the time period (m) after which the content of the storage unit is interrogated.

The method according to the invention allows the use of two types of level measurements. The warning device may actuate the warning signal indicating means immediately after it has been activated, or the warning signal indicating means may be actuated at a later time. The latter method enables the use of an early warning, i.e., a warning signal that can be given prior to the time the oil content drops to the specified minimum level. This capability is available since the warning device is also activated and a warning signal is given when the sensor signal is on for a predetermined second time period which is longer in duration than the minimum first time period. This will resolve the problem mentioned earlier, namely that of adapting the duration of the first minimum time interval to the varying requirements to be met because of the fluctuating operating conditions. Now, the level sensor can be installed in the reservoir at a place which is relatively high, and the duration of the second minimum time interval may be relatively long, whereas the duration of the first minimum time interval is relatively short. By selecting a suitable number (n) of activating events and a suitable duration (m) for the registering period, the warning signal indicating means will be actuated only after a predetermined number of acceleration situations have accumulated. Therefore, occasional displacements of the reservoir content, which may be of a relatively long duration, will not cause false alarms to be triggered since the duration selected for the second minimum time interval can be relatively long. Now, the relative long duration of the second minimum time interval, as compared to the prior art systems, is not harmful because the level sensor is mounted at a correspondingly greater height, so that even under those operating conditions in which the reservoir is not subjected to accelerations, a warning can be issued when the oil in the reservoir drops to the minimum permissible oil level or below that level.

The field of application of the invention can be enlarged so as to include instances in which the reservoir has not been moved and/or the level sensor has been out of operation for a certain period of time. This is accomplished, in accordance with a further feature of the invention, in that the operation of activating the warning device is registered as an activating event, and the warning device is activated again, preferably once, after a phase in which the reservoir has been stationary, whereupon a warning signal is issued. This arrangement will enable the use of the same level sensor for "static warning". This possibility is available for all systems of this category for "dynamic warning". This will also cause an early warning, i.e., a warning which indicates that the oil is about to drop below the minimum permissible level. For instance, if the warning device, as a result of (n) events within an interval (m), is activated at a time when, because of the parameter selection, the oil has not yet dropped to the minimum permissible level, and if this warning device activating event is being indicated in the form of a warning signal only after the reservoir has been in a quiescent state for a period of time, the vehicle operator will be warned, before the reservoir is being put in operation again, that the oil is close to the point of dropping below the minimum permissible level. Independently from this function, all activating events of the warning device which occur as a result of exceeding the second minimum time period can also be immediately indicated through a warning signal during an operating phase of the reservoir.

In accordance with a preferred embodiment of the invention, the reservoir is for use in association with an engine system, and the content of the reservoir is in the form of a hydraulic medium, lubricating oil, cooling liquid, fuel or other type of liquid, especially engine lubricating oil.

It should be appreciated that the aforedescribed procedural steps and components are intended to serve only as examples in terms of practical application, size, configuration, material and technical concept, so that those alternatives which are known in the particular field of application may be used in the practice of the invention.

BRIEF DESCRIPTION OF THE DRAWINGS

Other details, features and advantages of the invention will become apparent from the claims as well as the following description of the accompanying drawings, wherein a preferred embodiment of the invention is illustrated.

In the drawings.

DESCRIPTION OF THE PREFERRED EMBODIMENTS

Figure 1A:
FIGS. 1a and 1b are two graphs of the time dependency of the switching events of the level sensors for the cases where the oil level is 0.25 liter above minimum and at the minimum level respectively.
Figure 1B:
Figure 2A:
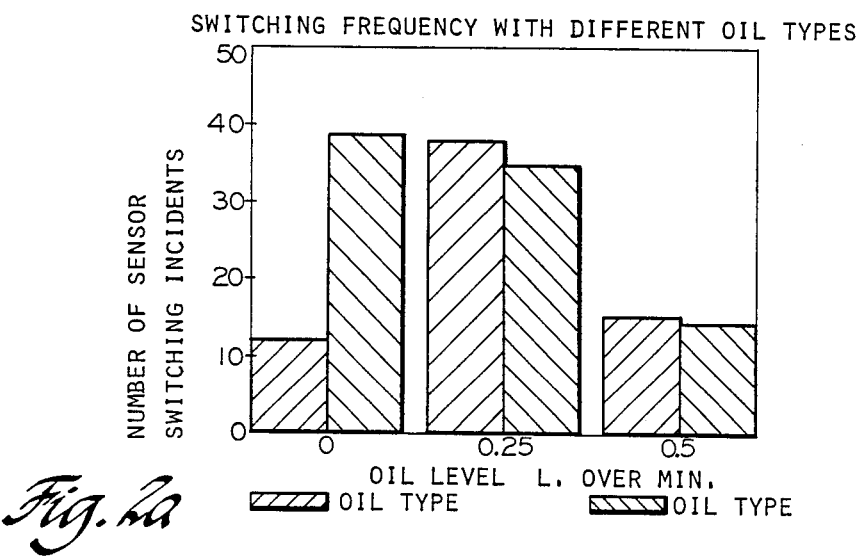
FIG. 2a is a set of bar graphs of the switching frequency of the level sensor in dependence on the type or viscosity of the oil and the liquid level in the reservoir.
Figure 2B:
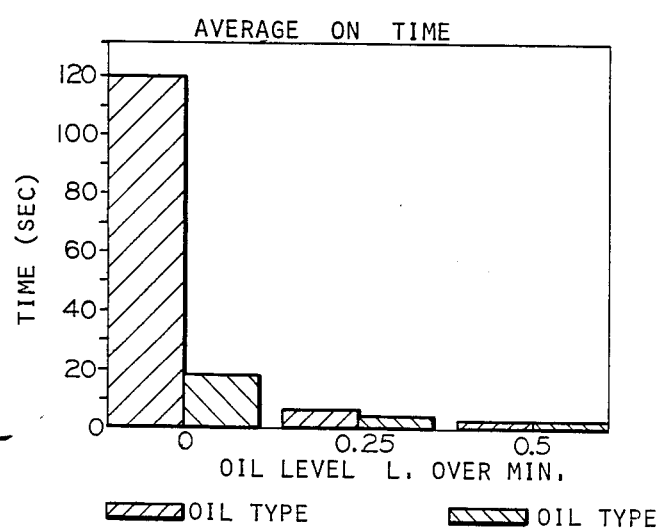
FIG. 2b is a set of bar graphs of the average on-period of the level sensors in dependence on the type or viscosity of the oil and the liquid level in the reservoir.

The invention will now be described as applied, by way of example, to the procedure of measuring the oil level in a motor vehicle engine. The oil level sensor used in the example is of the type that has been employed heretofore in connection with the "dynamic warning" method, i.e., a float-type switch. As is generally known, this type of sensor will indicate during transient conditions, e.g., inclination of the engine, a low oil level condition, which in fact does not exist. In order to preclude false alarms of this type, the sensor signal is to be evaluated (to be "screened") in a suitable fashion. When the oil level is dropping during these transient conditions or temporary engine tilting situations, the durations of the on-periods of the level sensor will increase as the oil level keeps dropping lower and lower, and the frequency of the "on" and "off" switching events will increase as the oil keeps dropping to a lower level. Since, in accordance with the invention, it is not only the duration of the on-period that must be sensed, but also the frequency of the switching events, it is necessary that a time window, i.e.; the time interval (m) be established within which the screening of the switching signals is to take place. Thus, the operations are always repeated after the time interval (m) has elapsed.

As apparent from FIGS. 1a to 2b, the switching frequencies as well as the on-period durations are increasing as the oil level drops. It is also apparent that there is an abrupt drop in the switching frequency once the oil has dropped to the minimum permissible level. This is because the average on-period of the oil level sensor is larger than the average time interval between two "on" and "off" switching events. Finally, it is apparent from these figures that the viscosity of the oil affects the switching frequency and the average on-period durations. One must therefore find, on the basis of the shape of the reservoir and the operating conditions to which it is subjected, the mounting location and the characteristics of the level sensor, as well as the physical characteristics of the oil, a suitable minimum duration ($t_1$) for the events to be registered as well as a suitable number (n) of such events, and a suitable length of the registration time period (m).

If now within a period of (m) minutes at least (n) switching events of a minimum duration ($t_1$) are being registered, the warning device will be activated and a corresponding warning signal will be issued. This warning indication may occur immediately or at a later time. If, for instance, the step of activating the warning device is being stored as an activating event, the warning may be issued only after the engine or the ignition have been turned off for a predetermined period of time and the ignition is then turned on again. As in the case of the "static warning" method, this arrangement will cause a warning signal when the engine is started and there is not enough oil in the crankcase. Likewise, a "static warning" can also be given when, during the preceding operating phase, the warning device had been activated due to a relatively long on-period of the level sensor, and this activating event had been registered.

Figure 3A:
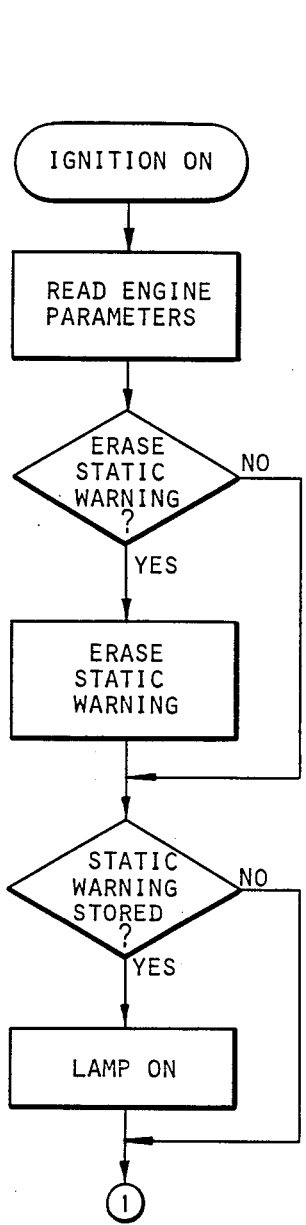
FIG. 3a is a program flow chart for "static" oil level warning at the time the engine is started.

In the program flow according to FIG. 3a, during the phase ENGINE PARAMETER-READING the desired minimum durations ($t_1$, $t_2$) and the time period (m) can be tuned or adjusted. Likewise, an event storage accumulation that may be present can be erased and the system be reset to a starting position. The decision phase, whether or not a stored static warning is to be erased, is intended for application in those instances in which, for instance, the ignition had been turned off for a very short period of time before it had been turned on again. If this period is shorter than, for instance, two seconds, the stored static warning will be erased and, consequently, no warning signal will be issued when the ignition is turned on again. Only after the ignition has been turned off for longer periods of time than, for instance, two seconds, a stored "static warning" will be subjected to further processing, i.e., a warning lamp will be energized.

Figure 3B:
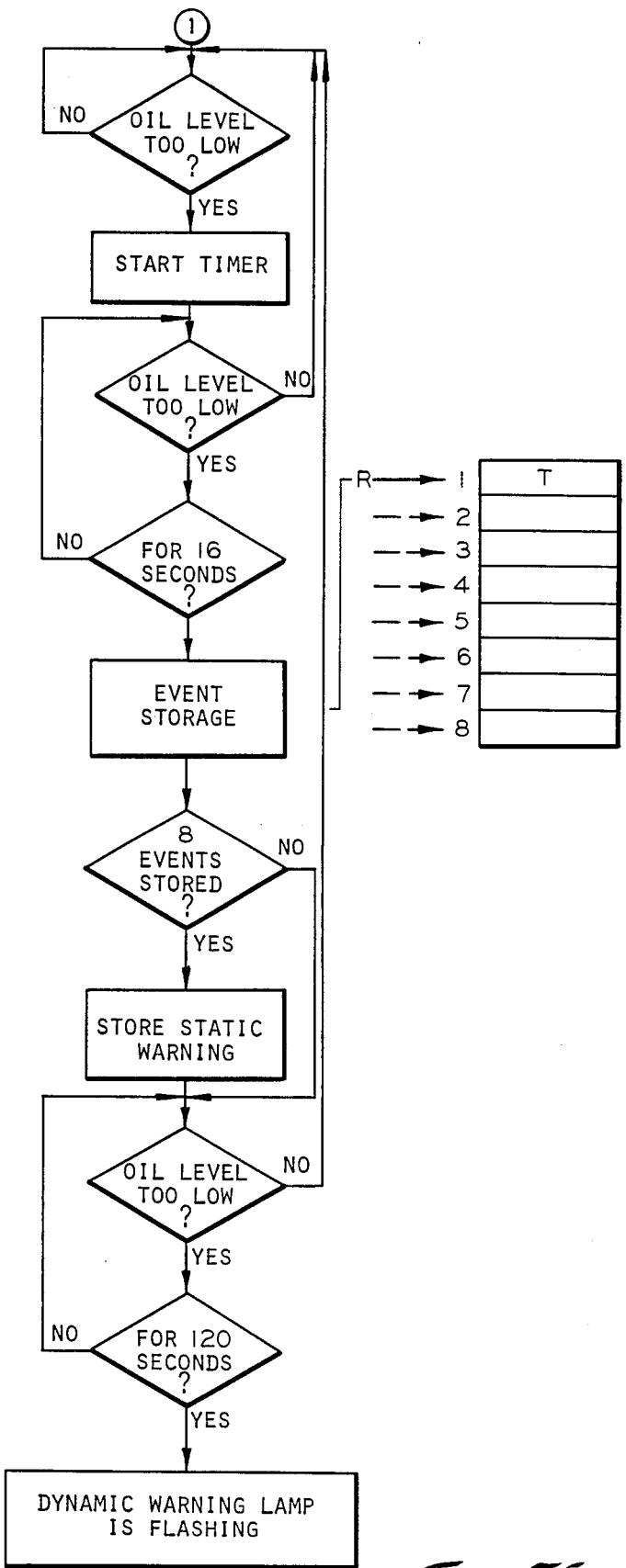
FIG. 3b is a program flow chart for the "dynamic" oil level monitoring and warning during vehicle travel.

In accordance with FIG. 3b, the program flow for monitoring the oil level starts with the interrogation of the state of the level sensor. If, for instance, the oil level is too low, a designated switch will be open and, in accordance with the reply "yes", the subsequent program flow is put into motion. If the switch is closed, i.e., if the reply is "no", the program flow is started all over again. If the switch is open for minimum time ($t_1$) in the range of 3 to 16 seconds, preferably 11 seconds, an event is detected and stored. The process of storing the events is handled in that the event register is continuously addressed by a register pointer R. The number of register or storage spaces corresponds to the event number (n) which is eight as shown in the drawing. To check in the examination phase whether (n) events have been stored, it is determined whether the content of all event registers does not equal zero. If the answer is "yes", this activating event is registered for the warning device and the warning is indicated as soon as the engine is started again.

Figure 3C:
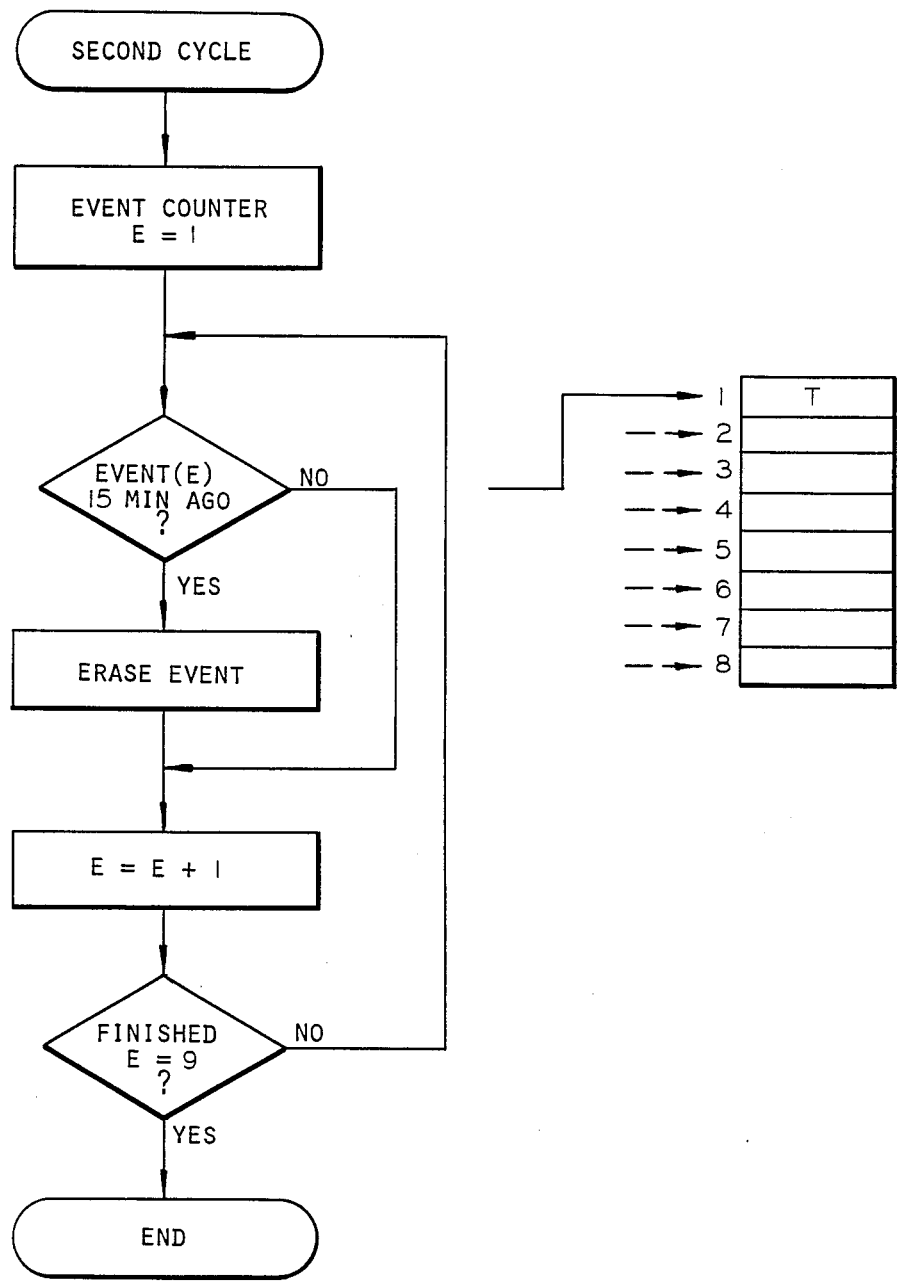
FIG. 3c is a program flow chart for the measuring time cycle in the case of "static and dynamic" oil level indication and warning.

As indicated in FIG. 3c in detail, a subprogram for the time window is required, because only when all storage spaces are occupied within the specified time period (m) of 10 to 20 minutes, preferably 15 minutes, is the warning device to be activated. If this is not the case, the routine will start all over again and will be repeated until the activating requirements have been met.

Otherwise, if the sensor signal is generated uninterruptedly for a period longer than the minimum period ($t_2$), which may amount to, for instance, 120 seconds, the warning device and the warning signal indicating means will be immediately activated (see FIG. 3b). The period ($t_2$) may be 31 to 127 seconds, preferably 127 seconds.

The embodiments of the invention in which an exclusive property or privilege is claimed are defined as follows:

1. The method of measuring the level of liquid in tanks subject to varying acceleration, comprising the steps of:
   generating a sensor signal when the liquid has dropped below a preset minimum level,
   detecting each event of a sensor signal being on continuously for a longer time than a first preset minimum period ($t_1$) in the range of 3 to 16 seconds,
   generating a warning signal whenever a preset number (n) of events are detected during another period (m) in the range of 10 to 20 minutes, and
   generating the warning signal when the sensor signal is continuously on for a second preset minimum time period ($t_2$) in the range of 31 to 127 seconds.

2. The method of measuring the level of liquid in tanks subject to varying acceleration, comprising the steps of:
   generating a sensor signal when the liquid has dropped below a preset minimum level,
   detecting each event of a sensor signal being on continuously for a longer time than a first preset minimum period ($t_1$),
   generating a warning signal whenever a preset number (n) of events are detected during another period (m) which is long in comparison to the first minimum period, and
   generating the warning signal when the sensor signal is continuously on for a second preset minimum time period ($t_2$) which is greater than the first minimum time period ($t_1$).

3. The method of measuring the level of engine oil in an oil reservoir of a vehicle engine subject to varying acceleration, comprising the steps of:
   generating a sensor signal when the oil has dropped below a preset minimum level, detecting each event of a sensor signal being on continuously for a longer time than a first preset minimum period ($t_1$), generating a warning signal whenever a preset number (n) of events are detected during another period (m) which is long in comparison to the first minimum period, and generating the warning signal when the sensor signal is continuously on for a second preset minimum time period ($t_2$) which is greater than the first minimum time period ($t_1$).

4. The method of measuring the level of engine oil in an oil reservoir of a vehicle engine subject to varying acceleration, comprising the steps of:

generating a sensor signal when the oil has dropped below a preset minimum level, detecting each event of a sensor signal being on continuously for a longer time than a first preset minimum period ($t_1$), generating a warning signal whenever a preset number (n) of events are detected during another period (m) which is long in comparison to the first minimum period, generating the warning signal when the sensor signal is continuously on for a second preset minimum time period ($t_2$) which is greater than the first minimum time period ($t_1$), and repeating the warning signal after the engine is stopped.

* * * * *